United States Patent
Martin et al.

(10) Patent No.: US 6,772,349 B1
(45) Date of Patent: Aug. 3, 2004

(54) DETECTION OF AN ATTACK SUCH AS A PRE-ATTACK ON A COMPUTER NETWORK

(75) Inventors: Hamish D S Martin, Edinburgh (GB); Ronald Brown, Fife (GB); Mark A Pearce, Edinburgh (GB)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/563,548

(22) Filed: May 3, 2000

(51) Int. Cl.[7] .......................... H04L 9/00; G06F 15/173
(52) U.S. Cl. ...................... 713/201; 713/200; 709/224
(58) Field of Search ................................ 713/190, 200, 713/201; 709/224, 223

(56) References Cited

U.S. PATENT DOCUMENTS

| | | | | |
|---|---|---|---|---|
| 5,621,889 | A | | 4/1997 | Lermuzeaux et al. ....... 395/186 |
| 5,987,611 | A | * | 11/1999 | Freund ........................ 713/201 |
| 5,991,881 | A | | 11/1999 | Conklin et al. ............. 713/201 |
| 6,055,236 | A | * | 4/2000 | Nessett et al. ............... 370/389 |
| 6,119,236 | A | * | 9/2000 | Shipley ....................... 713/201 |
| 6,154,839 | A | * | 11/2000 | Arrow et al. ................ 713/154 |
| 6,298,445 | B1 | * | 10/2001 | Shostack et al. ............ 713/201 |
| 6,304,975 | B1 | * | 10/2001 | Shipley ....................... 713/201 |
| 6,321,338 | B1 | * | 11/2001 | Porras et al. ................ 713/201 |
| 6,405,318 | B1 | * | 6/2002 | Rowland ..................... 713/200 |
| 6,408,391 | B1 | * | 6/2002 | Huff et al. ................... 713/201 |
| 6,487,666 | B1 | * | 11/2002 | Shanklin et al. ............ 713/201 |
| 6,578,147 | B1 | * | 6/2003 | Shanklin et al. ............ 713/200 |
| 6,609,205 | B1 | * | 8/2003 | Bernhard et al. ........... 713/201 |
| 6,614,800 | B1 | * | 9/2003 | Genty et al. ................ 370/464 |

FOREIGN PATENT DOCUMENTS

WO  WO 00/54458  9/2000

OTHER PUBLICATIONS

Technical Brief—Cisco Secure Intrusion Detection System Technical Overview, Jul. 3, 2000, available from http://www.cisco.com/warp/public/cc/pd/sqsw/sqidsz/tech/ntrantc.htm, "Sensor Capabilities" pps. 2–4.

Real Secure™ signatures Version 5.0, Jun. 2000, pps. i–x, 15–17, 186–187 and 263–264 only, availavle from http://www.iss.net/customer care/resource center/product lit/, "Portscan Detection" and "UDP Port Scan".

Robert Grahma, FAQ: Network Intrusion Detection Systems, Version 0.8.3, http://www.ticm.com/kb/faq/idsfaq.html, sections 1.6, 1.7, 1.9, 2.1.

* cited by examiner

*Primary Examiner*—Albert Decady
*Assistant Examiner*—Kambiz Zand
(74) *Attorney, Agent, or Firm*—Michaelson & Associates; Peter L. Michaelson; Janet M. Skafar

(57) ABSTRACT

A computer program detects a potential attack on a computer network. A list E is made from network traffic data including source and destination addresses of traffic on the network. The list E includes all source addresses in the data which are not allocated to the network and are not in a list X. A first address in list E is chosen. A number of data entries including A and B and representing network traffic passing between source address A, chosen from list E, and destination address B, allocated to the network, is counted. If the number of such data entries is more than T, address A is output, thereby identifying address A as a potential source of attack. If it is determined that any entries in list E are left, the next address in list E is moved to, and the counting, outputting and determining is repeated, otherwise, stopping.

10 Claims, 2 Drawing Sheets

DETECTION OF AN ATTACK SUCH AS A PRE-ATTACK ON A COMPUTER NETWORK

BACKGROUND OF THE INVENTION

The present invention relates to a method and apparatus for detection of an attack such as a pre-attack on a computer network by an unauthorized user.

Security is important to the manager of a modern computer network, be it a LAN (Local Area Network) or a WAN (Wide Area Network). Networks are usually attached to the Internet. Therefore, there is a constant risk that some malicious person from outside of a network may attempt to obtain access to the network and use this access to disrupt normal network activity or gain access to private information.

Many network managers use 'firewalls' (a device which filters traffic entering and leaving a computer network to protect it from malicious users) to protect their network from people outside the network. However, for many reasons firewalls are not suitable for all types of networks, since they may restrict the ability of legitimate users to use the network and even where they are used, it is useful to have an additional level of security. We will describe a technique for detecting when someone from outside a network is attempting to access the network in an unauthorized way. The technique does not require a firewall in order to operate, and thus can be used as a complement to existing firewalls. For users who do not use firewalls, the method described offers a way to try to detect unauthorized or malicious accesses to the network.

All devices on a network are identified by an 'address' (eg an IP address). When a device wants to send data to another device, it typically marks the data with the destination address of the device it wants to communicate with and then puts this data onto the network, where is it forwarded to the correct device based on the destination address.

When a malicious person wishes to attack a network, it is usual for them to carry out what is referred to as a "pre-attack" on the network, that is to try to identify addresses which identify actual devices within the network. It would be useful to be able to deal with this problem.

Thus the arrangement of the invention allows the network to identify such a pre-attack.

SUMMARY OF THE INVENTION

The present invention provides a computer program on a computer readable medium or embodied in a carrier wave, for detecting a potential attack on a computer network, comprising the following steps:

(a) from network traffic data which includes source and destination addresses of traffic on the network, make a list E of all the source addresses in the data which are not allocated to the network and which are not in a list X;

(b) choose a first address in list E;

(c) count a number of data entries which include A and B and which represent network traffic passing between a source address A chosen from list E and a destination address B allocated to the network;

(d) if the number of such data entries is more than T, output address A, thereby identifying address A as a potential source of attack;

(e) determine if there are any entries in list E left to process;

(f) if yes, move on to the next address in list E and repeat steps (c) to (e);

(g) if no, stop.

The present invention also provides a method for detecting a potential attack on a computer network, the method comprising the steps of the computer program outlined.

BRIEF DESCRIPTION OF THE DRAWINGS

A preferred embodiment of the invention will now be described by way of example only and with reference to the accompanying drawings in which.

DESCRIPTION OF THE PREFERRED EMBODIMENTS

A computer network will usually have a network manager who may set up, and control a computer network. The network manager will normally have his own network supervisor's workstation or computer.

Figure 1:
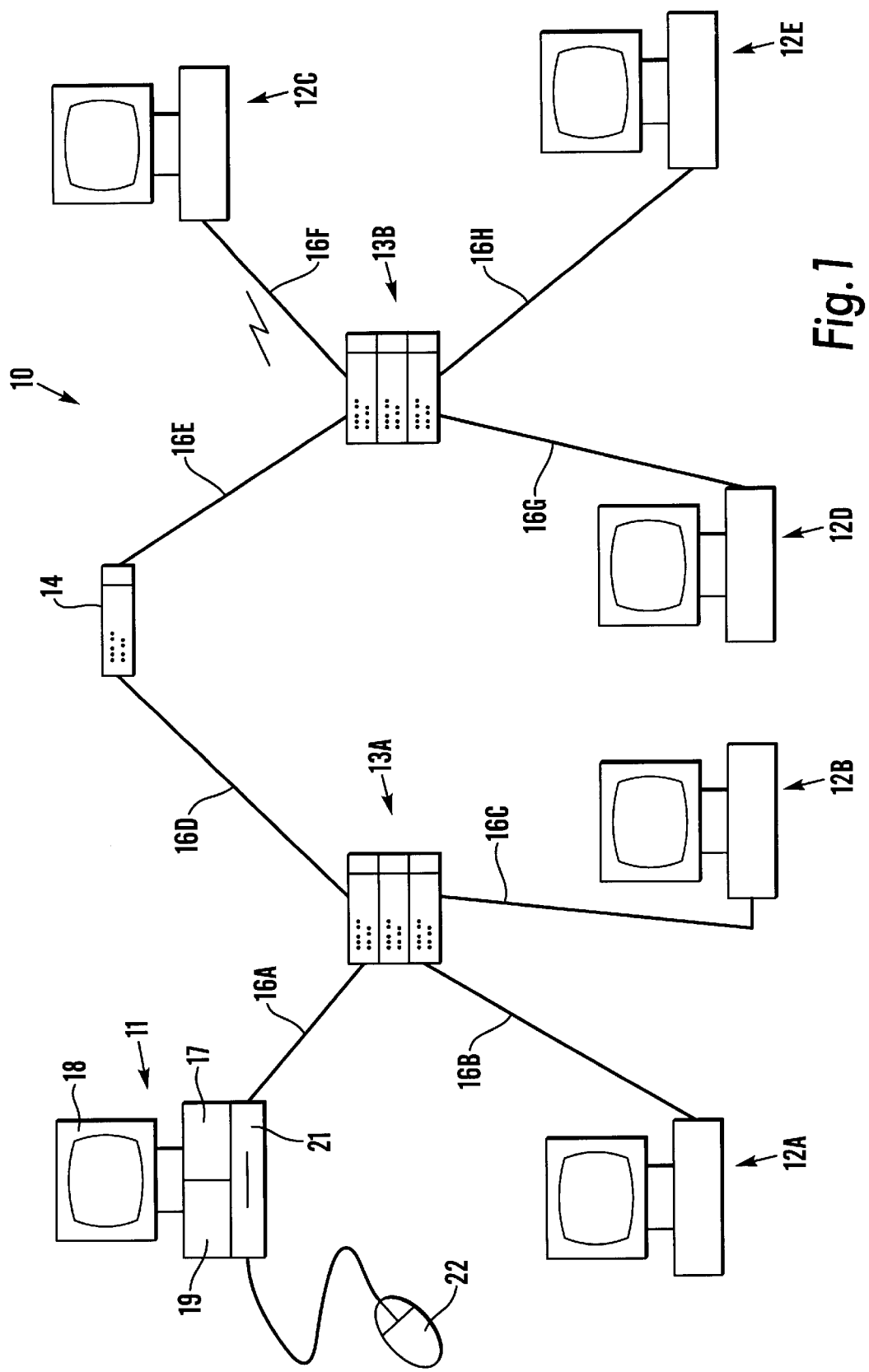
FIG. 1 is a diagrammatic view of a network incorporating a preferred embodiment of the invention.

Referring to FIG. 1 there is shown a network 10 comprising a plurality of devices in the form of a network supervisor's workstation or computer 11, other workstations 12A–E, hubs 13A, 13B, and switch 14. The network is a simple network and is set out for purposes of illustration only. Other configurations and arrangements, may be used.

The devices are connected together by means of links 16A–H which may be hard wired and utilize any desired protocol, and link 16F which is a wireless link.

The network supervisor's workstation includes, in addition to a visual display unit 18, a central processing unit or signal processor 19, a selector which may be in the form of a mouse 22, a program store 21 which may comprise, for example, a CD drive, a floppy disk drive or a zip drive, and a memory 17 for storing a program which may have been loaded from the program store 21 or downloaded for example via Internet from a website.

In a preferred arrangement, the computer 11 may, on command from the selector 22, process signals from the memory 17 by the signal processor 19 and provide on the visual display unit 18 a network map showing each of the devices and the links therebetween. In the examples shown, the network is simple but of course in many instances the network will be considerably more complex and it may be necessary to arrange that the visual display unit 18 only shows a simplified version or only part of the network at any one time.

In order to initialise a computer network, a network manager (or the installer) needs to assign addresses to all the devices on the network. Typically, the manager of a computer network will receive an allocation of possible addresses for devices. The manager may assign any of these addresses to the devices that are actually attached to the network at his discretion. It is usual to have many more allocated addresses than devices on the network and typically only a small fraction of the allocated addresses are actually used by devices on the network.

In order to access devices on a network, the malicious user needs to find out the addresses of the devices on the network that can be illicitly accessed. Since network managers usually try to protect their devices against malicious users, a malicious user may only be able to gain access to a small number of the devices on the network, or possibly no devices at all.

In order to find out the addresses of devices that can be illicitly accessed, a user will typically perform a 'pre-attack probe'. Since the range of addresses allocated to a particular network are public knowledge, a 'pre-attack probe' involves using a program to test in turn every address within the range of addresses allocated to the network. For every address allocated to the network, the pre-attack program assumes that there is a device assigned to that address, and attempts to contact the device at the address to determine if the device is susceptible to illicit access. If there is a device allocated to that address, then the device will respond to the 'pre-attack probe' and the malicious user can then attempt to access this device for his own illicit purposes. If there is no device allocated to the address, then there will be no response to the 'pre-attack probe'.

Since every device on the network must be using one of the allocated addresses, if allowed to continue access, in time the 'pre-attack probe' is certain to discover all the devices that are susceptible to illicit access.

So called 'Pre-attack probes' are a common precursor to other types of illicit network access. We will now describe a way to detect malicious users by detecting 'pre-attack probes' using information collected from the network.

As is well known, the network manager will normally have installed on his workstation a program that enables him to understand the technical operation of the network. Some of the devices within the network will be "managed" devices, that is devices which include a so called "agent" which collects and stores data relating to the operation of that device and the traffic passing through, to, or from it. The network manager's computer, using the relevant software, interrogates the agent of each device using a known protocol, such as SNMP (Simple Network Management Protocol).

A typical way of arranging this is to use a device called a RMON or RMON 2 (Remote Monitoring Specification) probe for collecting data about the activity of devices on the network. Such a device uses the SNMP to transfer RMON or RMON 2 information to the network management computer. The RMON 2 standard is defined in IETF RFC2021. The network manager's computer includes a store (memory) in which the traffic information is stored for a period of time (day, week, month). This historical information may be stored as a database.

This traffic information may be provided to the network manager in any convenient form such as a table or graphic on his VDU (Visual Display Unit).

In accordance with the preferred of the arrangement, to detect 'pre-attack probes' on a particular network (which we will call the local network), data is required which records the pattern of traffic on the network over a selected time interval. This data must record every pair of addresses A and B where a device using address A has attempted to communicate with a device using address B during the time period. A highly suitable source of data would be the RMON 2 probe (in RMON 2 either the alMatrix or niMatrix tables could provide this information).

The data must include every communication between an address outside the local network and an address within the local network. Ideally, the data would also include attempts to communicate with addresses which are allocated to the local network but which have no device associated with them. This data is most sensibly collected by monitoring traffic flowing between the local network and the outside world.

The data is collected by a network management computer over the course of a few minutes or hours and then the following analysis is performed on the data by means of an algorithm (program), and the network manager alerted by the application if a 'pre-attack probe' is detected. This would often mean that the network manager would be informed of the 'pre-attack probe' before the malicious user had a chance to do anything bad. This process is repeated continuously to provide constant monitoring for 'pre-attack probes.'

The preferred method of the invention is carried out under the control of the network manager's work station or computer and in particular by means of a program controlling the process of that computer or elsewhere in the system.

The program for controlling the operation of the invention may be provided on a computer readable medium, such as a CD, or a floppy disk, or a zip drive disk carrying the program or its equivalent, or may be provided on a computer or computer memory carrying the website of, for example, the supplier of the network products. The program may be downloaded from which ever appropriate source and used to control the processor to carry out the steps of the invention as described. For the purpose of explanation it is assumed that the traffic data is presented as a list E of address pairs of the form (A,B). An entry in the list E of (A,B) indicates that a device with address A communicated or attempted to communicate with a device with address B during the time interval which the data corresponds to. (There may, however, be no device with address B). Although the precise representation of addresses in the list is not important, devices will usually be represented by IP address, since this is the form in which RMON 2 data is presented. If an RMON probe is used it normally provides the traffic data in the form of an 'nlMatrix' table of data. The nlMatrix table records information about all conversations between devices, and stores them, using absolute counters, in a table which is ordered by network-layer protocol (e.g. 'IP') and source and destination addresses (i.e. IP addresses). An agent would record an entry in this table for every conversation which it has 'seen'.

Typically, a row in the stored table would look like this:

| Protocol | Source Address | Destination Address | Packets | Bytes |
| --- | --- | --- | --- | --- |
| IP | 123.45.67.89 | 98.76.54.32 | 400 | 50000 |

The 'packets' and 'bytes' columns represent how many packets and how many bytes have been seen en route, travelling from the source address to the destination address. The precise details of the table are given in the [RMON 2 RFC].

The following is a simple example of how this RMON 2 data could be used to form data into a list, which would be in a suitable form for the algorithm:

1. Create an empty list L.
2. A program would read the entire nlMatrix table from a number of RMON 2 agents.
3. The program would wait for a predetermined period of time (e.g. 10 minutes).
4. The program would read the entire nlMatrix tables from the same agents again.
5. If the 'packets' count has changed on any row between step 1 and step 3, then an entry is added to list L containing (source address, destination address).
6. Remove duplicate entries from list L.

Thus list L contains a series of entries (A,B) which represent traffic flowing from A to B, as required by the algorithm.

There are a variety of other, more sophisticated techniques which could be used for generating data in the required form from RMON 2 data. For example, the algorithm could use data that has been collected and stored in a historical database. The algorithm assumes that it is possible to determine if an address is allocated to the local network. There are multiple ways to achieve this, including allowing the network manager to indicate which addresses are allocated to the network and/or discovering addresses of local devices using some automatic process referred to briefly above.

In essence, the algorithm provides a method for determining a pre-attack on the computer network comprising determining, over a period of time, and for each device address outside the local network, the number of communications or attempted communications with devices within the local network, and where the number exceeds a predetermined number (T), providing an indication that the external device address is a potential source of pre-attack. This is the process at its simplest.

However, other uses of the network may result in traffic patterns that resemble the traffic pattern of a 'pre-attack probe'. For this reason, the algorithm below provides a list of trusted devices, called list X. This list is intended to contain a list of devices which the network manager does not believe will ever be the source of a 'pre-attack probe' (for example, addresses in another network of the same company). The algorithm will never indicate that any trusted device from this list has performed a 'pre-attack probe' and so the likelihood of a false alarm is reduced.

The algorithm assumes the existence of a numerical threshold value T. T is the maximum number of devices on the local network that a legitimate device outside of the local network might access in the time period of data collected. The actual value used for T is based upon the length of time over which the data was collected and the size of the local network. Too low a value of T will make the algorithm produce 'false alarms', while too high a value may mean that genuine 'pre-attack probes' are not detected. A value of T might be 10–100, typically 50.

The output of the algorithm is a list of addresses of devices that appear to have attempted a 'pre-attack probe' during the time interval of the data collected.

Figure 2:
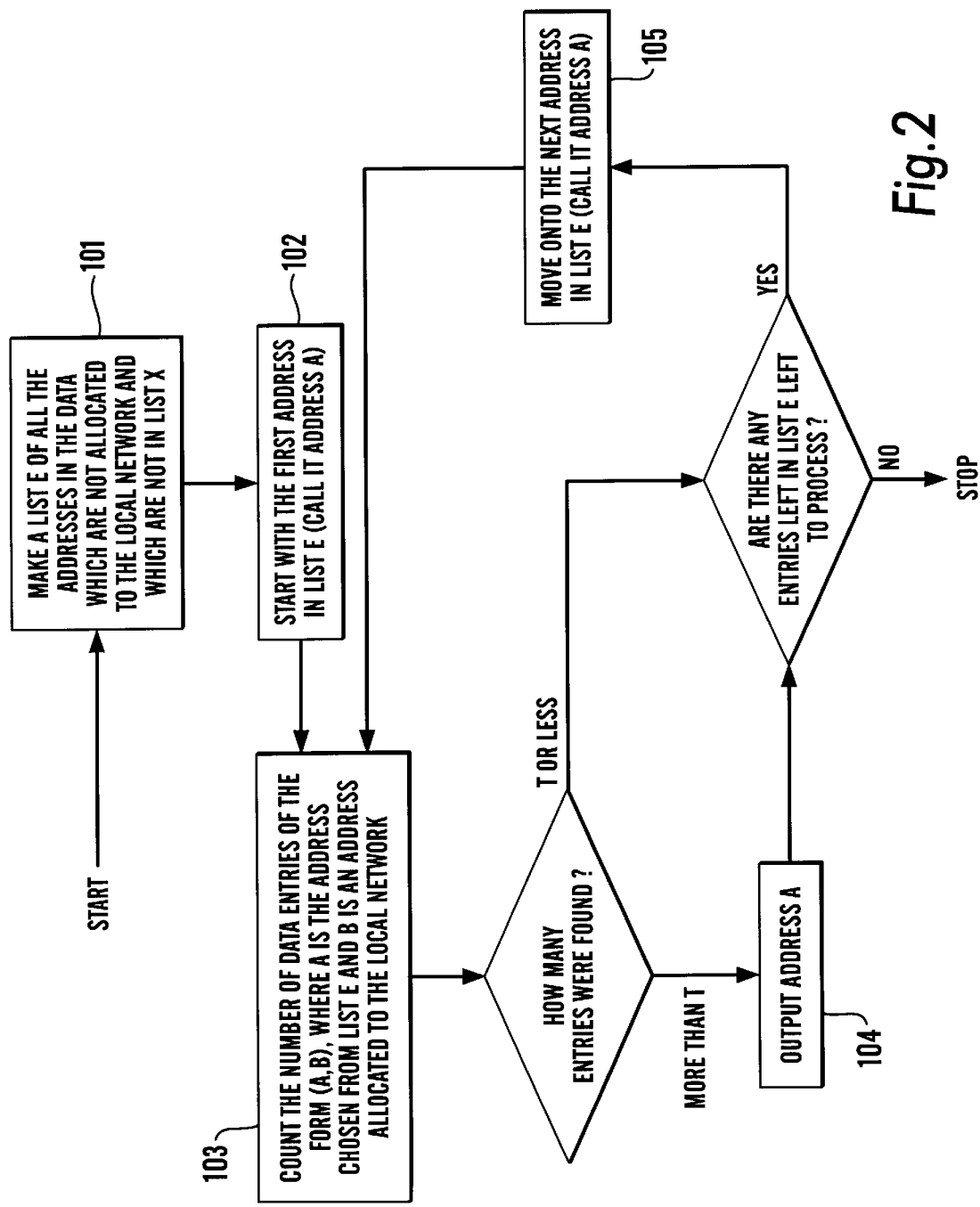
FIG. 2 is a flow chart of the steps of the preferred embodiment of the invention.

The program may include an algorithm of the form set out in the FIG. 2.

Thus the program may include the following steps:

program step 101, from network traffic data which includes the source and destination addresses of traffic on the network, make a list E of all the (source) addresses in the data which are not allocated to the local network and which are not in list X;

program step 102, start with first address in list E (call it address A);

program step 103, count the number of data entries of the form (AB) where A is the address chosen from list E and B is any address allocated to the local network;

if the number of such data entries is more than T, in program step 104, output address A;

are there any entries in list E left to process?;

if no, stop;

if yes, at program step 105 move on to the next address in list E (call it address A) and return to program step 103.

The address or addresses outputted at step 104 will be passed to the network manager's computer and highlighted as the address(es) of a potential malicious person attempting to gain access to the computer and using a pre-attack technique.

The preferred method of the invention is carried out under the control of the network manager's work station or computer and in particular by means of a program controlling the process of that computer or elsewhere in the system.

The program for controlling the operation of the invention may be provided on a computer readable medium, such as a CD, or a floppy disk, or a zip drive disk carrying the program or its equivalent, or may be provided on a computer or computer memory carrying the website of, for example, the supplier of the network products.

The program may be downloaded from which ever appropriate source and used to control the processor to carry out the steps of the invention as described.

Note that the operation of the invention is not affected by the presence or absence of a firewall.

It should be noted that the arrangement described uses historical data. In other words, traffic data is collected over a period of time and is then analysed subsequently. In this way patterns and relationships that build up over a course of time can be readily identified. If one were to try to carry out the same process in real time, and to maintain the data for a short period of time, it can be difficult to establish patterns of use. Thus, for example, the pre-attack program might access a succession of addresses in the local network over the course of a period of time which may range from minutes through to an hour or two and by using historical data the relevant information can be readily accessed and analysed and becomes apparent.

We have described the method in terms of detecting an attack such as a pre-attack. However the same technique can be used to determine other forms of pattern of usage.

The invention is not restricted to the details of the foregoing example.

What is claimed is:

1. A computer program on a computer readable medium for detecting a potential attack on a computer network, comprising the following steps:

(a) from network traffic data which includes source and destination addresses of traffic on the network, make a list E of all source addresses in the data which are not allocated to the network and which are not in a list of trusted devices called list X;

(b) choose a first address in list E;

(c) count a number of data entries which include A and B and which represent network traffic passing between a source address A chosen from list E and a destination address B allocated to the network;

(d) if the number of such data entries is more than a maximum number of devices, output address A, thereby identifying address A as a potential source of attack;

(e) determine if there are any entries in list E left to process;

(f) if yes, move on to the next address in list E and repeat steps (c) to (e);

(g) if no, stop.

2. A computer program embodied in a carrier wave for detecting a potential attack on a computer network, comprising the following steps:

(a) from network traffic data which includes source and destination addresses of traffic on the network, make a list E of all addresses in the data which are not allocated to the network and which are not in a list of trusted devices called list X;

(b) choose a first address in list E;

(c) count a number of data entries of a form (AB) where A is an address chosen from list E and B is any address allocated to the network;

(d) if the number of such data entries is more than a maximum number of devices, output address A thereby identifying address A as a potential source of attack;

(e) if the number of such data entries is less than the maximum number of devices, determine if there are any entries in list E left to process;

(f) if yes, move on to the next address in list E and repeat steps (c) to (e);

(g) if no, stop.

3. A method for detecting a potential attack on a computer network, comprising the following steps:

(a) making a list E, from network traffic data which includes source and destination addresses of traffic on the network, of all the source addresses in the data which are not allocated to the network and which are not in a list of trusted devices called list X;

(b) choose a first address in list E;

(c) count a number of data entries which include A and B and which represent network traffic passing between a source address A chosen from list E and a destination address B allocated to the network;

(d) outputting address A if the number of such data entries is more than a maximum number of devices, thereby identifying address A as potential source of attack;

(e) determine if there are any entries in list E left to process;

(f) if there are any entries in list E left to process, moving on to the next address in list E and repeat steps (c) to (e);

(g) stopping if there are no entries in list E left to process.

4. A method as claimed in claim 3 in which only some of the addresses within the network are connected to devices.

5. A method as claimed in claim 3, in which the network traffic data is a pattern of traffic network over a selected time interval.

6. A method as claimed in claim 5 in which the network traffic data is collected by an RMON probe.

7. A method as claimed in claim 3 wherein each source address identified as a potential source of attack is excluded from access to the network.

8. A computer program on a computer readable medium for carrying out the method of claim 3.

9. A computer program embodied in a carrier wave for carrying out the method of claim 3.

10. A method for detecting a potential attack on a computer network, comprising:(a) making a list E, from network traffic data which includes source and destination addresses of traffic on the network, of all the source addresses in the data which are not allocated to the network and which are not in a list of trusted devices called list X;(b) choose a first address in list E;

(c) count a number of data entries of a form (AB) where A is an address chosen from list E and B is any address allocated to the network;

(d) outputting address A, if the number of such data entries is more than a maximum number of devices, thereby identifying address A as potential source of attack;

(e) determining if there are any entries in list E left to process, if the number of such data entries is less than the maximum number of devices;

(f) moving on to the next address in list E if there are any entries in list E left to process, and repeating steps (c) to (e);(g) stopping if there are no entries in list E left to process.

* * * * *